United States Patent [19]

Jacobsen

[11] 4,327,303
[45] Apr. 27, 1982

[54] ROTOR ASSEMBLY FOR A DYNAMOELECTRIC MACHINE

[75] Inventor: Jon E. Jacobsen, Greendale, Wis.

[73] Assignee: Siemens-Allis, Inc., Atlanta, Ga.

[21] Appl. No.: 191,912

[22] Filed: Sep. 29, 1980

[51] Int. Cl.³ .............................................. H02K 1/30
[52] U.S. Cl. .................................... 310/261; 310/269
[58] Field of Search .............. 310/258, 261, 262, 265, 310/269, 259, 264

[56] References Cited

U.S. PATENT DOCUMENTS

| | | | |
|---|---|---|---|
| 1,808,568 | 6/1931 | Page | 310/261 |
| 1,817,054 | 8/1931 | Baudry | 310/269 |
| 3,046,426 | 7/1962 | Gynt | 310/265 |

Primary Examiner—J. D. Miller
Assistant Examiner—D. L. Rebsch
Attorney, Agent, or Firm—Frederick W. Powers, III

[57] ABSTRACT

The rotor assembly comprises a shaft, a rim structure, and a spider for connecting the rotor rim to the shaft. The spider structure incorporates a number of rigid arms which are secured to and extend radially from the shaft. The ends of the rigid arms are secured such that free radial motion of the rotor rim is permitted with respect to the spider, but angular motion between the rotor rim and the spider is prevented. The rotor assembly further contains a plurality of flexible cross beams and associated floating arms. The cross beams extend between adjacent spider arms, while the floating arms are firmly connected between the middle section of the cross beams and the inner surface of the rotor rim. The cross beams flex in and out in radial directions as the rotor rim contracts and expands, respectively, due to centrifugal or thermal forces.

10 Claims, 2 Drawing Figures

ROTOR ASSEMBLY FOR A DYNAMOELECTRIC MACHINE

BACKGROUND OF THE INVENTION

1. Field of the Invention

The present invention relates to a rotor assembly for a dynamoelectric machine. In particular, this invention relates to a rotor assembly having a spider structure secured to a rotor shaft and a rotor rim structure. Still more particularly, this invention relates to a rotor assembly the supporting structure of which is exposed to large expansion forces due to rotation and/or temperature differences.

2. Description of the Prior Art

During the operation of a rotating electric machine the rotor rim is subject to strong centrifugal forces. It is therefore necessary to give the rotor assembly a construction which has sufficient dynamic stability at different speeds.

To this end, in previously used rotor assemblies the rotor rim has commonly been secured in such a manner that it is subjected to a high radial pre-stress, either by shrinking it on the rotor support structure or by loading it with radial pressure rods. Such a construction of the rotor assembly is, however, very expensive and demands great accuracy during manufacture and assembly.

In other previously used rotor assemblies a design has been applied which contains a rotor rim incorporating a magnetic core, a hub structure for securing a rotor shaft therein, and a center supporting structure or spider for connecting the rotor rim to the hub structure. In this design, dovetails are machined on the rotor spider arms and matching dovetail slots are punched into the more laminations of the rotor rim. The rotor core laminations are slid on the dovetail bars on the rotor spider arms, thus locking the rim to the arms and transmitting torque between the rotor rim and shaft. Such a design, however, does not allow for a free radial expansion of the rotor rim.

From various publications it is generally known to locate a rotor rim on a supporting structure or spider by means of guides, wedges or keys. These devices allow radial expansion but prevent angular motion between the punching of the rotor rim and the spider.

U.S. Pat. Nos. 3,046,426 and 3,470,405, for instance, both disclose a slot-and-key approach which allows a laminated rotor rim to move radially outward, but prevents peripheral movement relative to the spider structure. According to U.S. Pat. No. 3,046,426, a key or wedge can be used which is urged outwardly by a plate sandwiched between a pair of aligned spider arms. Grooves in the spider arms and in the lamination stack locate them with respect to one another, by means of the wedged core. In U.S. Pat. No. 3,470,404, basically the same design is used, although it applies multiple keys or wedges which ride in a separate channel formed by a U-shaped slide bar. In order to effect a favorable transmission of the tangential forces between the slide bars and the rotor disc, the slide bars are provided with tangentially protruding attachment members which are welded onto the ends of the web plates or arms of the spider. Yet, these members do not flex or bend outwardly.

In U.S. Pat. No. 1,687,512, a rotor assembly is disclosed which allows radial expansion of a laminated core or rim by means of locating pins which extend through the lamination and are received in mating holes of the spider. Thus, the connection between the spider arms and the rotor rim transmits torque between them without exerting radially acting forces which resist the outward movement of the rotor rim when its circumference elongates under the action of centrifugal forces. In particular, the pins are radially arranged and carried by the outer rim. They are slideably fitted in openings formed in angle brackets which are bolted to the ends of the spider arms. Also in this design a flexible connection between the spider arms and the rotor rim is not provided.

It is therefore an object of this invention to provide a rotor assembly that accommodates rotor rim expansion due to rotation and/or temperature differences while still allowing the rotor core to be located and supported in the stator core, and to transmit torque to or from the rotor shaft.

It is another object of this invention to provide a rotor assembly that permits small radial movements of the rotor rim in response to forces associated with rotation, while assuring that the rotor assembly will always remain concentric with its axis of rotation.

It is another object of this invention to provide a rotor assembly, including a spider or supporting structure for supporting the rotor rim, which permits a light and comparatively inexpensive construction for the supporting structure without overstressing the supporting construction due to radial movement of the rotor core in response to forces associated with rotation and different temperatures between the rotor rim and the supporting structure.

It is still another object of this invention to provide a simple manufacturing method for mounting a rotor rim on a supporting structure or spider in order to obtain a rotor assembly for a dynamoelectric machine.

SUMMARY OF THE INVENTION

According to this invention, the foregoing objects are achieved by providing a rotor assembly for a dynamoelectric machine incorporating a shaft, a rotor rim structure and a spider or supporting structure for connecting the rotor rim structure to the shaft. The spider or supporting structure includes a plurality of solid spider arms which are secured to the shaft and extend radially therefrom.

In a preferred embodiment guiding means are associated with the rotor rim and the outer ends of the spider arms such that a free radial motion of the rotor rim is possible, but that angular motion between the rotor rim and the spider arms is prevented.

The rotor assembly further incorporates a plurality of flexible cross beams which extend generally tangential to the shaft and connecting adjacent spider arms. Connection elements are provided and may be floating arms extending in a radial direction of the rotor assembly, and fixed to the cross beams and to the rotor rim.

The flexible cross beams are used to transmit torque between the spider structure and the rotor rim. Further, due to their springy properties they allow the rotor rim to expand radially outwardly in accordance with the prevailing centrifugal forces and/or temperature conditions.

The foregoing and other objects, features and advantages of the invention will be apparent from the following more particular description of preferred embodiments of the invention, as illustrated in the accompanying drawings.

DETAILED DESCRIPTION OF A PREFERRED EMBODIMENT

Figure 1:
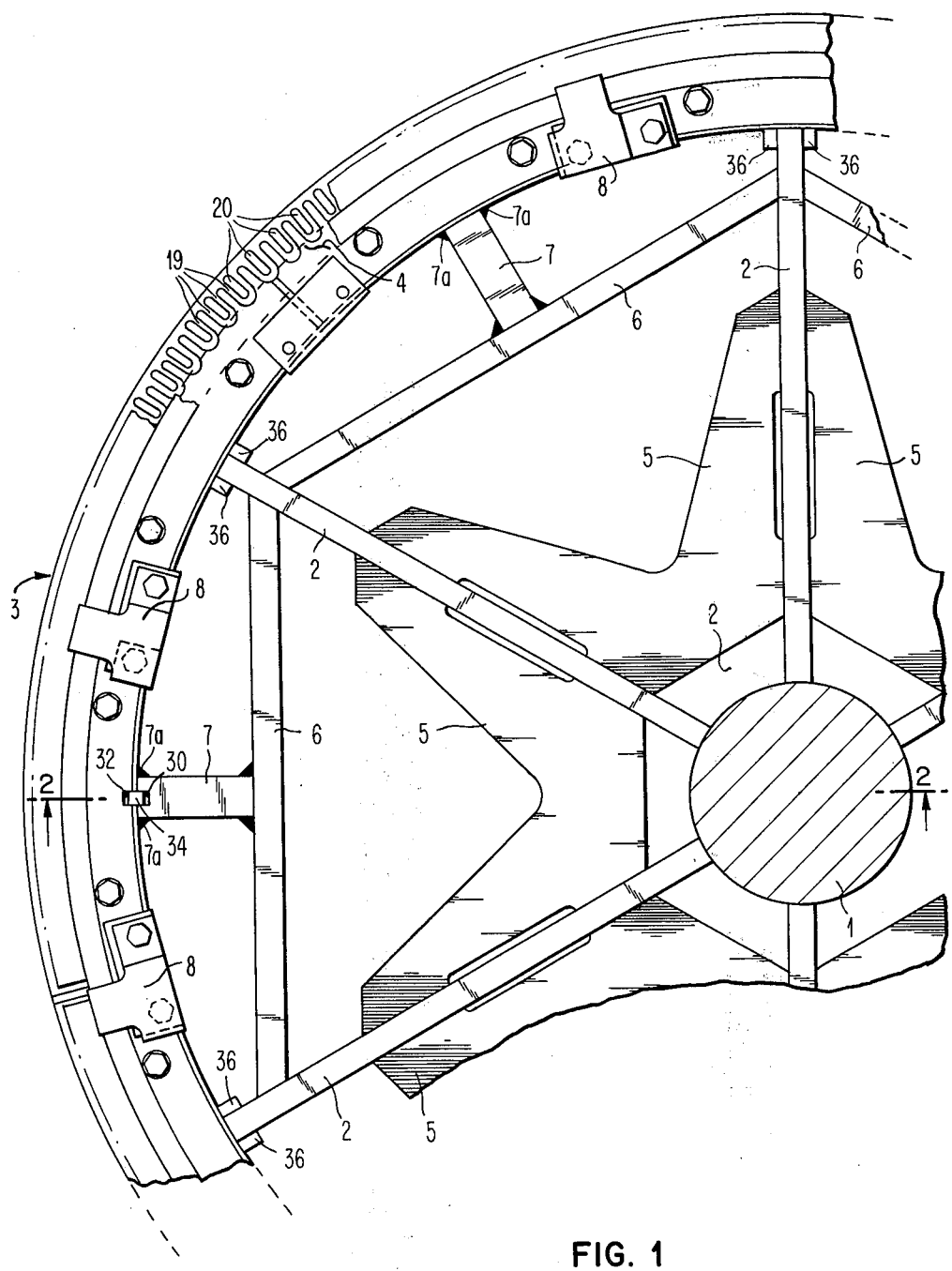
FIG. 1 is an end view of a rotor assembly of a squirrel cage induction motor, includng a partial sectional view of the squirrel cage rotor bars inserted into slots which are distributed along the outer circumference of the rotor assembly.
Figure 2:
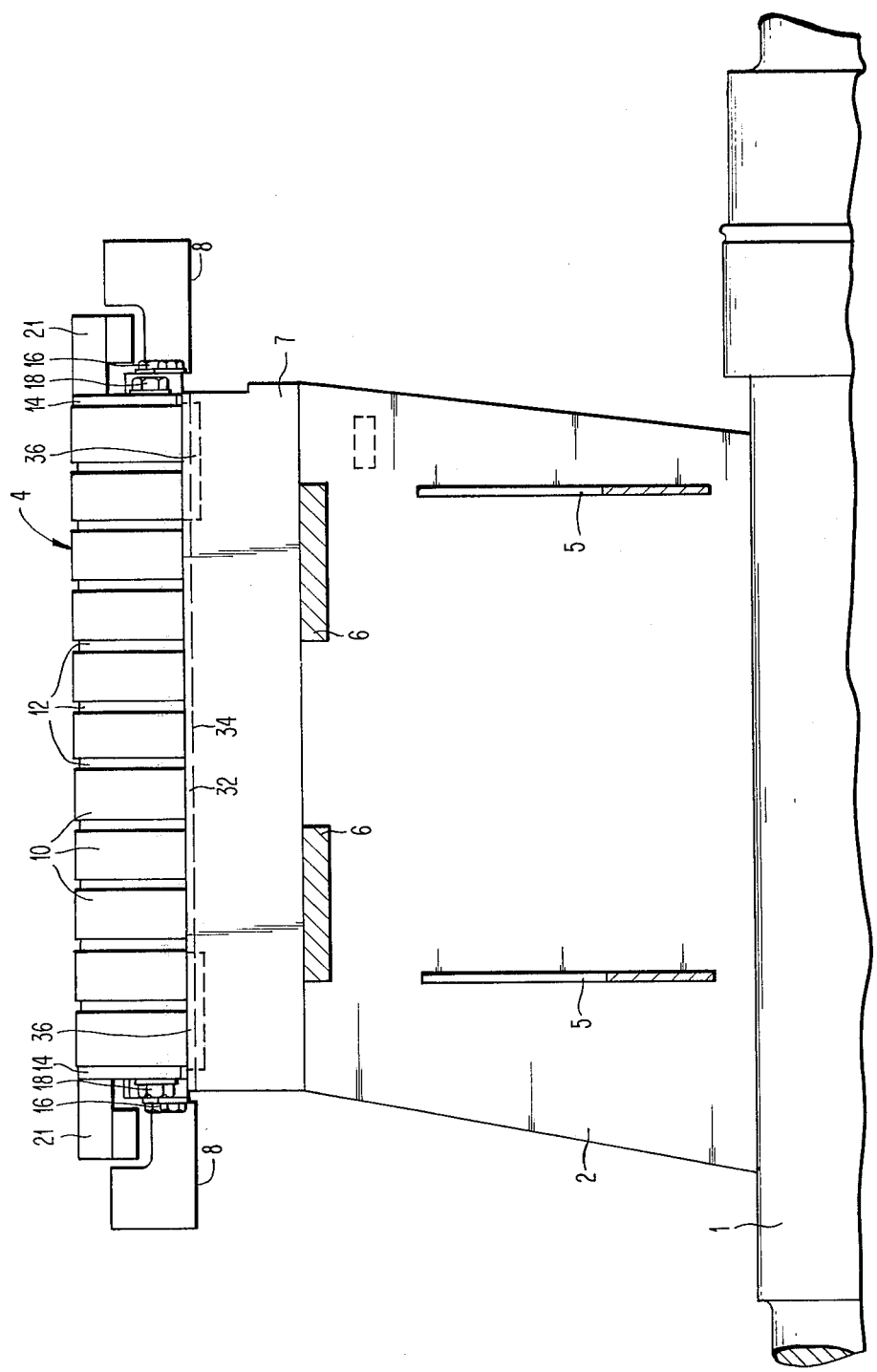
FIG. 2 is a cross-sectional view along the line II—II in FIG. 1, whereby the lower half of the cross-sectional view has been omitted.

With reference to FIGS. 1 and 2, the rotor assembly of a dynamoelectric machine, herein illustrted as an induction motor, contains a rotor shaft 1 which is rotatable about its longitudinal axis. A supporting structure or spider containing six solid supporting or spider arms 2 is attached to shaft 1. The inner ends of these spider arms 2 are directly and firmly connected to the shaft by appropriate means such as welding. A rotor rim structure 3 surrounds the spider. The rotor rim structure 3 is an annular body which comprises a laminated magnetic core 4 and windings such as rotor bars 20. The rotor rim structure 3 is mounted on the spider in a way which will be explained in more detail below. It will be realized that for other types of machines the rim structure characteristics will vary; for example, in a salient pole synchronous machine the rotor rim structure may be a rolled steel cylinder.

As can be seen in FIG. 2, the solid spider arms 2 are formed by metal plates which extend axially along the length of the rotor rim. For stabilization and reinforcement of the star-like arrangement of the spider arms 2, intermediate members such as bracing plates 5 are arranged transversely to the spider arms. In the depicted embodiment two sets of plates 5 are provided. Both sets are parallel to, and axially spaced from, each other.

Adjacent or neighboring spider arms 2 are connected to one another by flexible or resilient cross beams 6. The cross beams 6 are arranged tangentially with respect to the rotor shaft 1 and in the illustrated embodiment are secured close to the radially outer ends of the spider arms, preferably by welding. As can be seen in FIG. 2, the cross beams 6 take the form of metal plates which extend axially within the rotor. In the depicted embodiment the cross beam connection is formed by two metal plates 6 and 6a; in other words, between two spider arms 2 two cross beams 6 and 6a are aligned with respect to each other. When viewed in an axial direction these two metal plates are arranged behind each other, and therefore are not both visible in FIG. 1.

A bar or floating arm 7 is welded to the radially outer side of each cross beam 6 and 6a. This floating arm 7 is welded in the center between each pair of two interconnected spider arms 2 and extends radially outward. The radially outer end of the floating arm 7 engages the inner surface of the rotor rim structure. In the final assembly position, the outer end of each floating arm 7 is connected to the rotor rim 3 by welding, as indicated at 7a. Similarly to the solid spider arms 2, the floating arms 7, welded to the middle section of a cross beam 6 or 6a between two solid arms 2, consist of an axially continuous metal plate. Therefore, if one looks along the axial extension of a floating arm 7, each of the floating arm 7 is connected to two cross beams 6, 6a which are axially aligned with each other as can be seen in FIG. 2. By providing several spaced cross beams instead of a single beam which runs the length of the rotor, cooling air from the central area of the rotor can flow radially outwardly between the cross beams and through the rotor rim. The radial members identified as floating arms 7 and the associated cross beams 6, 6a act as spring attachments for the rotor rim 3 to ensure that the rotor rim will always return to its relaxed position.

The complete supporting structure described above for supporting the rotor rim is designed as a welded construction. This provides great advantages, particularly with regard to manufacturing expenditures and costs, which can be kept relatively low. The individual components may be produced as simple metal plates, and these components may subsequently be assembled to their final star-like support construction by a simple welding process.

As also illustrated in FIG. 2, the rotor core 4 is built up of laminations stacked in short axial stacks 10. These stacks 10 are separated from each other by spacer pieces or spacer bars 12 and kept in a certain axial distance from each other. The radially extending spacer pieces 12 form ventilating ducts for directing streams of cooling air radially through the core. Fans 8 encourage the circulation of cooling air through the machine in the standard manner.

The rotor core including the stacks 10 and the spacer pieces 12 is clamped between end plates 14. Studs or bolts 16 extend axially throughout the whole rotor rim assembly. The end plates 14 are held together by these studs 16 and by nuts 18 screwed on their ends.

Because of the large diameter of the motor and for the purpose of a simple production and mounting, the entire rotor rim is assembled in several single arcuate segments which are connected to each other. The assembly of such segments is performed by welding in the conventional manner.

As can be seen in the upper right side of FIG. 1, which is a partially sectional view at the outer circumference of the rotor rim 3 there are provided axial slots or grooves 19 which are equally distributed about the rotor periphery. Electrically conducting squirrel cage rotor bars 20 are inserted axially into these slots 19. The bars 20 are connected to each other on either outer end face of the rotor rim assembly by a conventional end rings 21 and 22.

In the radially outer end face of at least one of the floating arms 7 is provided a keyway or slot 30. A corresponding keyway 32, which also extends axially, is provided in the rotor rim. The keyway 32 in the laminated punchings of the rotor core is aligned with the keyway 30 in the floating arm 7. The two keyways 30 and 32 are used for aligning the rotor supporting structure and the rotor core 4 when the rotor core 4 is mounted on the support structure. In FIG. 1 a single connection by means of keyways 30 and 32 is provided at the upper floating arm 7. The keyways 32 extending long the total axial length of the rotor core 4 is also illustrated in FIG. 2.

During assembly, the keyway 30, which is provided in the radially outer end of one of the floating arms 7, and the keyway 32, which is provided along the inner circumference of the rotor core 4, face each other. After alignment, the two keyways 30 and 32 are located together by a key 34 which is driven axially into keyways 30 and 32.

The connection between the floating arm 7 and the rotor rim 3 via keyways 30, 32 and key 34 is used for torque transmission between the rotor rim assembly and the inner supporting structure (spider), and thus between the rotor rim and the shaft 1. Depending upon the specific construction the welding fillets 7a between the outer ends of the floating arms 7 and the inner surface of the rotor core 4 are the principal means for transmitting torque. These welding fillets 7a are provided at each floating arm 7 including the upper floating arm 7. That is, the fillets 7a are equally distributed along the entire inner peripheral area of the rotor core. Aside from the transmission of torque, they also have the task of transmitting radial forces between the rotor rim assembly and the flexible cross beams 6, 6a.

Also in a preferred embodiment along the inner peripheral surface of the rotor rim, short axial bars 36 are welded to this surface on each side of the solid spider arms 2. These axial bars 36 are sliding guides for the outer ends of the solid spider arms. The rotor rim may move radially due to centrifugal forces or heat changes. Bars 36 abut both sides of the solid arms 2, yet they are not firmly connected to these sides and thus are guiding members. Bars 36 need not extend the full length of the rotor assembly, and sets of short bars along the length of each spider arm may suffice.

The method of assembly of the rotor rim 4 and the inner supporting structure including the cross beam 6, 6a and the floating arm 7 will now be described. It is assumed that the rotor rim assembly is placed on the spider. In the first step, both subassemblies will be aligned with respect to each other by means of the keyways 30 and 32 in the floating arm 7 and in the inner peripheral area of the rotor rim, respectively. By turning the outside diameter of spider arms 2 to the inside diameter of the rim assembly, location and assembly can be further enhanced. In this aligned position, both subassemblies will subsequently be fixed by inserting the key 34 into both keyways 30 and 32. In the next step, the radially outer ends of the floating arms 7 will be welded to the inner peripheral area of the rotor core 4. Subsequently to the fixing of the aligned subassemblies, that is the rotor rim assembly and the inner supporting structure, the short axial bars 36 are welded to the inner peripheral surface of the rotor ring 4. The bars 36 form guiding slots which open radially towards the interior of the supporting structures. As indicated above, the bars 36 are in contact with the radial spider arms 3, but not welded to them.

The sets of axial bars 36 guide the rotor core 4 as it expands and contracts due to centrifugal and/or heat forces. Thus, the center of the rotor rim does not translate relative to the center of rotation. The solid spider arms 2 do not have to sustain tension or compression due to radial movement of the rotor rim. Nevertheless, for affording torque transmission there is a mechanical connection between the rotor core 4 and the spider structure via the floating arms 7. As indicated earlier, these floating arms 7 are welded at one end to the inner peripheral surface of the rotor ring 4 and at the other end to the middle section of the cross beams 6, 6a. The cross beams 6, 6a in turn, are connected at their outer ends to the solid spider arms 2. Due to the resilient properties of the cross beams 6, 6a an extensive stress of the solid spider arms 2, which might be caused by centrifugal forces or different heat conditions, is avoided. Such extensive stress might occur in a connection link between the solid spider arms 2 and the rotor rim 4.

When the rotor rim moves radially outward, the flexible cross beams 6, 6a are bent radially outwardly by the floating arms 7. If the radial forces cease, the bending stress of the flexible cross beams will cause the rotor rim to be pulled back symmetrically. The cross beams which bridge the solid spider arms 2 therefore need the rotor rim in a position concentric with shaft 1.

The floating arms 7, being welded to the ends of the laminated rotor ring 4 and also to the cross beams 6 and 6a, will transmit torque between the rotor ring 4 and the spider, as well as act as spring attachments to return the rotor ring 4 to its relaxed position. The key 34, then, may serve primarily to position the laminated core assembly on the spider prior to welding the floating arms 7 to the rotor ring 4. In some applications, the axial bars 36 may be omitted.

While the form of the rotor assembly herein described constitute preferred embodiments of the invention, it is to be understood that the invention is not limited to these precise forms of assembly, and that a variety of changes may be made therein without departing from the scope of the invention.

What is claimed is:

1. A rotor assembly for a dynamoelectric machine, comprising in combination:
   (a) a rotor shaft having an axis of rotation;
   (b) a rotor rim structure surrounding said shaft;
   (c) a spider connecting said rotor rim structure and said shaft, said spider comprising a plurality of spider arms secured to and extending radially from said shaft;
   (d) a plurality of flexible cross beams, each of said cross beams connecting at least two of said spider arms; and
   (e) connection means for firmly connecting said cross beams to said rotor rim assembly, said cross beams thereby flexing in an out in radial directions as said rotor rim assembly contracts and expands, respectively.

2. A rotor assembly according to claim 1, further including guiding means associated with said rotor rim structure and the outer ends of said spider arms for guiding said rotor rim assembly such that a free radial motion of said rotor rim assembly is permitted, but that an angular motion between said rotor rim assembly and said spider arms is prevented.

3. The rotor assembly according to claim 1, wherein said connection means comprises floating arms having two ends, one end being firmly connected to said flexible cross beams and the other end being firmly connected to the inner surface of said rotor ring.

4. A rotor assembly according to claim 3, wherein said cross beams have a center portion located midway between two adjacent spider arms, and wherein said one end of said floating arms is firmly connected to said center portion.

5. A rotor assembly according to claim 3, wherein said floating arms extend radially outwardly from said cross beams.

6. A rotor assembly according to claim 3, wherein said one end of said floating arms is welded to said cross beams, and wherein said other end is welded to said inner surface of said rotor ring.

7. A rotor assembly according to claim 3, wherein a first keyway is provided in said other end of at least one of said floating arms, wherein a corresponding second keyway is provided in said inner surface of said rotor ring, wherein said two keyways are aligned parallel to each other, and further comprising a key disposed in said keyways.

8. A rotor assembly according to claim 2, wherein said guiding means for guiding said rotor ring comprises a radial slit joint which is arranged between the inner surface of said rotor ring and the outer end of at least one of said spider arms.

9. A rotor assembly according to claim 8, wherein said radial split joint includes two sliding bars which are firmly connected to said inner surface of said rotor ring and which enclose the outer end of said spider arms.

10. A rotor assembly according to claim 1, wherein said flexible cross beams are steel plates, wherein two of said cross beams connect neighboring spider arms with each other, and wherein said two cross beams are aligned apart from each other.

* * * * *